United States Patent [19]
Pickett et al.

[11] Patent Number: 6,024,178
[45] Date of Patent: Feb. 15, 2000

[54] DIRECT HARVESTER DEVICE AND METHOD

[75] Inventors: J. Paul Pickett; Jay D. Christensen, both of Burley, Id.

[73] Assignee: River Valley Manufacturing, Inc., Burley, Id.

[21] Appl. No.: 08/965,727

[22] Filed: Nov. 7, 1997

[51] Int. Cl.⁷ ................................................... A01D 13/00
[52] U.S. Cl. .......................... 171/134; 171/127; 171/128; 171/27; 171/1; 172/44
[58] Field of Search .................................. 171/124, 27, 1, 171/62, 57, 134, 126, 127, 133, 128; 172/44; 460/123, 127, 142, 144

[56] References Cited

U.S. PATENT DOCUMENTS

| | | |
|---|---|---|
| 2,379,781 | 7/1945 | Blaydes . |
| 2,441,244 | 5/1948 | Kimball . |
| 2,718,110 | 9/1955 | Butler . |
| 3,294,094 | 12/1966 | Dreyer . |
| 3,537,530 | 11/1970 | Bettencourt et al. . |
| 3,548,950 | 12/1970 | Phelan et al. . |
| 3,690,383 | 9/1972 | Malley et al. . |
| 4,166,505 | 9/1979 | West ............................................. 171/1 |
| 4,257,216 | 3/1981 | Eiker, Jr. et al. ...................... 171/27 X |
| 4,416,334 | 11/1983 | Bouillon .................................... 171/27 |
| 4,588,033 | 5/1986 | Orthman . |
| 5,103,624 | 4/1992 | Marshall . |
| 5,284,212 | 2/1994 | Huckins et al. . |
| 5,350,020 | 9/1994 | Vandever et al. . |
| 5,577,562 | 11/1996 | Gresham .................................. 171/27 |
| 5,588,494 | 12/1996 | Pickett et al. . |

*Primary Examiner*—Victor Batson
*Attorney, Agent, or Firm*—Thorpe, North & Western, LLP

[57] ABSTRACT

A direct harvester includes a cutting portion, a lifting portion and a feeding portion. The cutting portion typically includes a cutter rod for severing plant roots and a kicker rod for encouraging the plant to the soil surface. The lifting portion typically includes a rotating pickup head for lifting the plants off the soil and separating the plant from the soil, and a pair of rotating tubes to move the plants and encourage further separation of soil from the plants. The feeding portion includes an auger which receives the plants from the rotating tubes and channels the plants into the opening of a combine feeder housing. Preferably, the floor below the auger is screened to allow soil which is knocked free by the auger to fall back to the ground. Additionally the lifting portion and the feeding portion are preferably pivotably attached to one another to enable the harvester to adapt to differing contours in the soil.

29 Claims, 6 Drawing Sheets

DIRECT HARVESTER DEVICE AND METHOD

BACKGROUND OF THE INVENTION

1. Field of the Invention

The present invention relates to a device for harvesting crops. More particularly, the present invention relates to a direct harvester which enables the direct harvesting of crops such as beans and peas without requiring the crops to be windrowed prior to harvesting.

2. State of the Art

The harvesting of certain plants such as beans or peas raises several problems for farmers and significantly impacts the profitability of raising such crops. For example, a bean plant, such as that shown at 10 in FIG. 1, was traditionally cut by a blade 26 which passed shortly below the upper surface 14 of the soil 18 in which the bean plant was grown. The cut bean plants 10 were then formed into windrows and allowed to dry for several days. The windrows of dried bean plants where then collected by a combine and processed to remove the beans from the remainder of the plants.

While such a system has been used for many years, it suffers from some serious drawbacks which significantly interfere with the profitability of raising beans. One major disadvantage of the conventional method discussed above is the requirement of windrowing the plants. Cutting the plants and forming windrows to allow plant drying is time consuming. Likewise, collecting the plants from the windrow is also time consuming. Thus, the farmer is forced to go over each piece of farm land twice in order to harvest the crops. This, of course, wastes time and money, as additional help must often be hired to ensure that the windrows can be harvested in a timely manner. Furthermore, the speeds at which most farm implements will travel while forming the windrows or collecting the windrows is usually quite limited.

Another problem with the formation of windrows is that it leaves the farmer at the mercy of the weather. If the beans are sitting in a windrow, a heavy rain can ruin portions of the crop. Even a light rain can cause problems as the beans must be allowed to dry out before they are harvested. Additionally, strong wind storms may disturb the windrows and cause additional loss of the crop.

In order to overcome these disadvantages, attempts have been made to directly harvest the bean plants. As part of these attempts, the bean plants are cut slightly above the surface 14 of the soil 18. Presently, such systems use large cycle or blades 30 which move with a scissor-like action slightly above the soil 18. While such systems have reduced the time required to harvest the beans by omitting the collection of windrowed plants, and have decrease the amount of loss due to rain, etc., while the plants are windrowed, the loss is still relatively high.

One major problem with the current direct harvest approaches is that the pods 22 containing the beans are disposed near the ground in many varieties of bean plants 10. Thus, it is common for the pods 22 to be shattered by the cutting element 30 which moves along the surface 14 of the soil 18 and which shears the stem of the bean plant 10. Once the pod 22 shatters, the beans contained therein fall to the ground and are lost. The loss rates caused by shattered pods 22 can be substantial. Currently, such a system may expect to encounter a loss rate of between 23 and 27 percent of the bean crop.

Another problem with this approach is that the cutting blades 30 have a tendency to periodically lift soil as they cut the plants. The soil is moved with the plants and enters the combine. Inside the combine, the soil can cause considerable wear on the threshing mechanism and other components which work the combine. Thus, the useful life of the combine is significantly reduced and down time is increased. For this reason, most firms which lease combines specifically prohibit the use of their combines with direct harvesting devices.

Still another problem is that the current attempts at direct harvesting is that the machine must move very slowly to prevent the loss rates from being unacceptable. Thus, considerable time is required to harvest a given bean crop, potentially increasing the number of machines which must be used to harvest the crop within the desired time period.

Thus, farmers are faced with the dilemma of using the traditional cutting approach and losing a significant amount of time, and potentially a significant amount of the crop, or using the current direct harvest approach and suffer considerable crop losses and damage to their combines. In light of the significant disadvantages of either current approach, there is currently a need for a harvesting apparatus and method which enables the harvesting of peas and beans in such a manner as to decrease loss during the harvesting process, increase harvesting speed and decrease the amount of soil which enters the combine during current direct harvesting approaches.

SUMMARY OF THE INVENTION

Thus, it is an object of the present invention to provide an improved harvesting device and method which avoids the necessity of windrowing crops during the harvesting process.

It is another object of the present invention to provide such a harvesting device and method which decreases the amount of crop lost during the harvesting process.

It is still another object of the present invention to provide such a harvesting device and method which decreases the time necessary to harvest the crop.

It is still yet another object of the present invention to provide such a harvesting device and method which reduces the damage done by soil during the harvesting process to associate farm implements.

The above and other objects of the invention are realized in specific illustrated embodiments of a direct harvesting device and method, the device having a rotating cutting rod for shearing the bean, pea, etc. plant below the surface of the soil in which it has grown. A lift/separator is disposed adjacent the cutting rod. Once sheared, the plant and the soil surrounding it preferably contact a lift/separator device, which lifts the plant and separates soil from the plants as the plants are being moved out of the soil. A pickup head is disposed adjacent the lift/separator means. The plant contacts the pickup head which lifts the plants above the ground, further separating the plants from the soil, and passes them toward an auger. The auger is configured to receive the plants and to direct them through the feeder housing of a combine.

In accordance with one aspect of the invention, one or more slinging devices are disposed between the pickup head and the auger to move the plants toward the auger, while removing soils from the plants. Preferably the slinging devices are formed by two tubes having differing cross-sectional geometry and are rotated at an appropriate speed to prevent plants from bunching between the pickup head and the auger.

In accordance with another aspect of the invention, the auger tube has a pair of flights disposed thereon. The flights are configured to draw the plants from a plurality of rows together as the auger rotates and to direct the plants into the opening of a combine's feeder housing.

In accordance with another aspect of the present invention, a screening member is disposed beneath the auger to enable the elimination of additional amounts of soil from the plants as they pass over the auger without additional crop loss.

In accordance with yet another aspect of the invention, the lift/separator is a rotating kicker tube which forces the plants from the soil while removing soil from around the base of the plants. The kicker tube provides directional movement to the plants, without jarring them sufficiently to break off the beans, peas, etc.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 2:
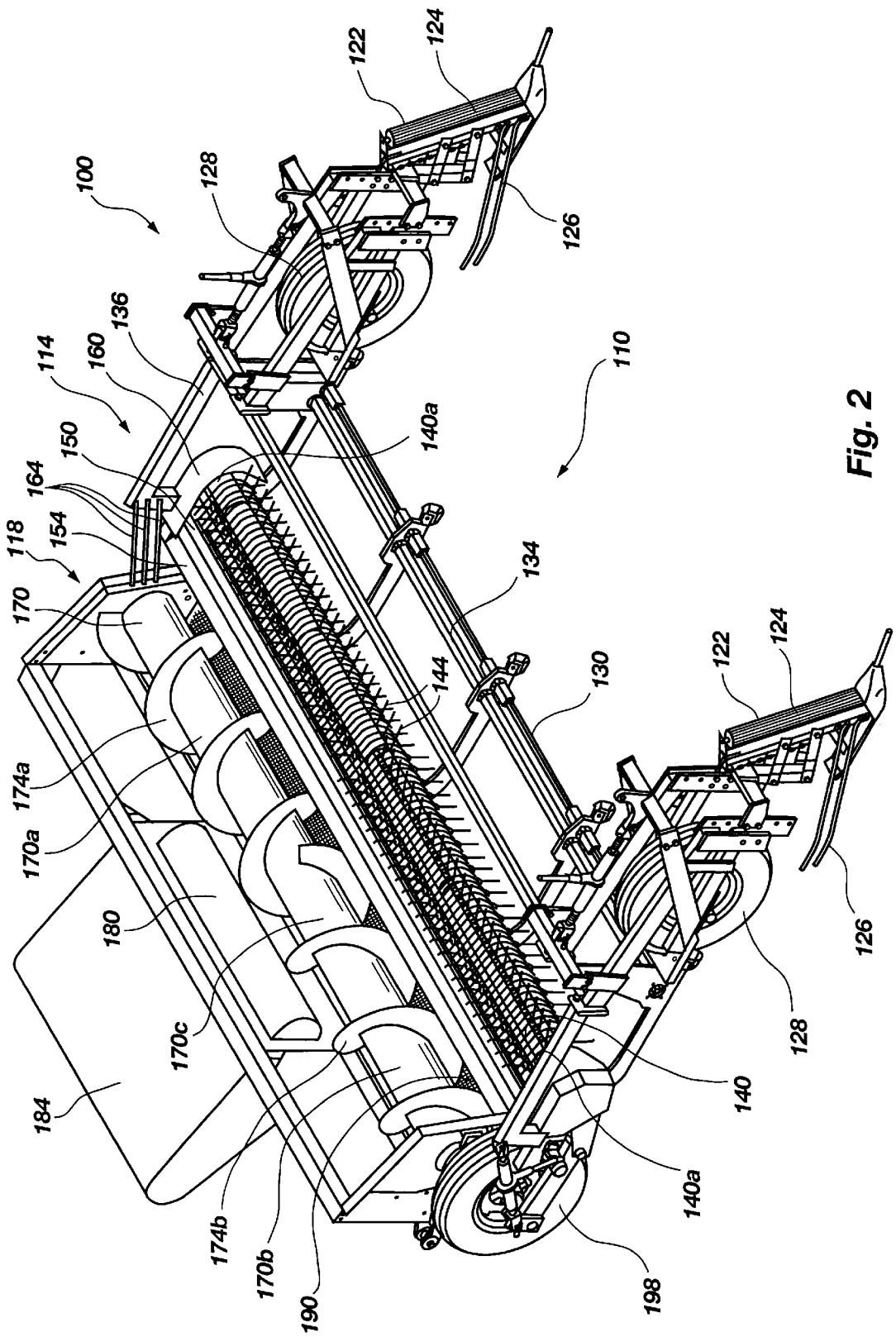
FIG. 2 shows a perspective view of a direct harvester for connection to a combine in accordance with the principles of the present invention, along with the feeder housing of a combine.

Referring to FIG. 2, there is shown a perspective view of a direct harvester, generally indicated at 100, made in accordance with the principles of the present invention. The direct harvester 100 includes a cutting portion, generally indicated at 110, a lifting portion, generally indicated at 114, and feeding portion, generally indicated at 118. The three portions work together to enable direct harvesting of beans with dramatically less loss while enabling the user to travel at a greater rate of speed.

The cutting portion 110 includes a pair of foliage dividers 122, which are disposed on lateral sides of the harvester. The foliage dividers 122 each include a roller 124 and a plurality of angled rods 126. The rollers 124 and the angled rods 126 are disposed to divide plants in different rows, and thereby prevent damage to the unharvested plants as the harvester passes through a field.

The height of the cutting portion 110 can be adjusted by a front gauge wheel 128. By changing the position of the gauge wheel 128, the user can adjust the depth at which a cutter rod 130 cuts through the soil. As the cutter rod 130 moves through the soil, the rod severs the plants from their roots, thereby allowing the plant to be harvested.

Disposed a short distance behind and slightly above the cutter rod 130 is a kicker rod 134. The kicker rod 134 is larger in cross-sectional area than the cutter rod 130 and is configured to lift the plants after they have been cut by the cutter rod. The kicker rod 134 also encourages separation of the plants from the soil. The kicker rod 134 is typically slightly larger than the cutter rod 130 and is often of a square cross-sectional shape. Additionally, the kicker rod 134 is usually rotated in a direction opposite the cutter rod 130 to encourage movement of plants toward the surface of the soil.

Both the cutter rod 130 and the kicker rod 134 are held in position by a rod support frame 136. Typically, the foliage dividers 122 and the front gauge wheels 128 are ultimately supported by the rod support frame 136 as well.

After being contacted by the kicker rod 134, the plants are lifted from the ground by a pickup head 140 which preferably is disposed generally parallel with the kicker rod and the cutter rod 130. The pickup head 140 includes a tube (discussed below) with a plurality of fingers (some of which are identified at 144) attached thereto so that the fingers rotate about the tube along a path perpendicular to the long axis of the tube. The fingers 144 engage the plants and lift them from the ground. As the plants are lifted, the majority of the soil is removed from the plants. Any soil dislodged from the plants falls between the fingers 144 and thus is not passed on to the combine (not show).

Once the plants are lifted by the pickup head 140, they are passed to one or more slinging devices. The slinging device (s) is configured to both move the plants and to further dislodge any soil disposed thereon. Thus, as shown in FIG. 2, the slinging devices are formed by a first roller 150 having a hexagonal cross-sectional geometry, and a second roller 154 which has a generally round cross-sectional geometry. The first and second rollers 150 and 154 are preferably disposed in parallel with the pickup head 140 and are rotated at a speed coordinated with the speed of the pickup head 140 to ensure that no bunching of plants occurs on the slinging devices. By quickly moving the plants away from the pickup head 140, the first roller 150 and second roller 154 ensure that the pickup head 140 will be able to rotate and not become entangled with the plants.

To prevent plants from being lost by laterally exiting the harvester 100, a foliage flow shield 160 is disposed on the opposing ends 140a of the pickup head 140. To further prevent loss of plants by outward lateral movement, a plurality of foliage control rods 164 are disposed adjacent the first roller 150 and the second roller 154.

From the second roller 154, the plants are directed toward the auger 170. As shown in FIG. 2, the foliage control rods 164 can be disposed at an angle to channel any laterally displaced plants back toward the auger 170.

Figure 1:
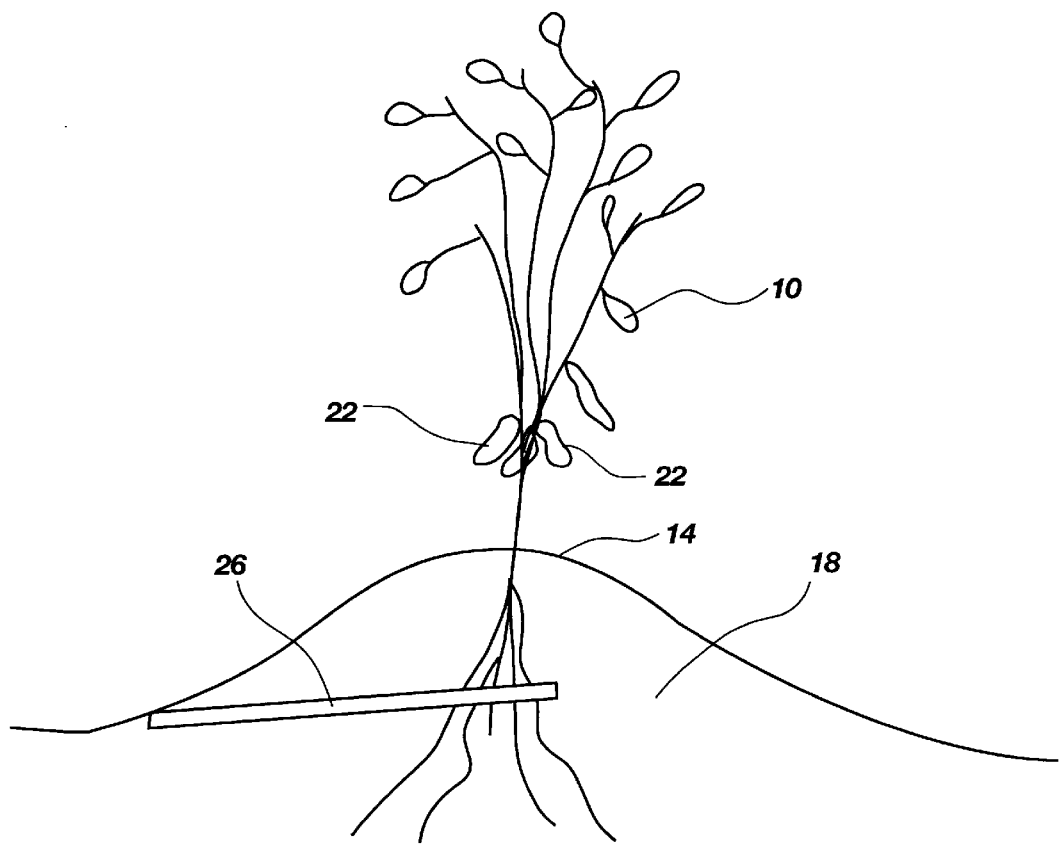
FIG. 1 shows a view of a bean plant being harvested in accordance with the principles of the prior art.

The auger 170 preferably is disposed in parallel with the pickup head 140 and the first and second rollers 150 and 154. A pair of flights 174a and 174b are disposed on the auger 170 in opposing helical formation to channel plants contacting the auger 170 into the opening 180 of a combine feeder housing 184. As shown in FIG. 1, flight 174a is disposed on the right side 170a of the auger 170 and is formed with a helical orientation configured to channel plants leftward as the auger is rotated. In contrast, flight 174b is disposed on the left side 170b of the auger 170, and is formed with a helical orientation configured to channel plants rightward as the auger is rotated. Thus, the auger 170 draws plants from both sides 170a and 170b into a middle portion 170c of the auger. The middle portion 170c of the auger 170 is disposed adjacent to the opening 180 of the combine's feeder housing 184 which is typically disposed in a combine during use.

In addition to moving the plants toward the center of the harvester 100 as it rotates, the auger 170 also assists in further removal of soil from the plants. A screen 190 is disposed below the auger 170 so that soil knocked free from the plants can return to the ground. Preferably, the screen is sized to allow small pieces of soil to fall therethrough, while maintaining beans, peas, etc., which have been knocked free from their plants.

Also shown in FIG. 2 is one of the rear gauge wheels 198. As with the front gauge wheels 128, the rear gauge wheels 198 are used to raise and lower the harvester 100 to adjust the height of the harvester with respect to plants being cut. Those skilled in the art, will appreciate that farmers will desire to adjust the height of the harvester 100 due to soil conditions and the particular species of plant being harvested.

Figure 3:
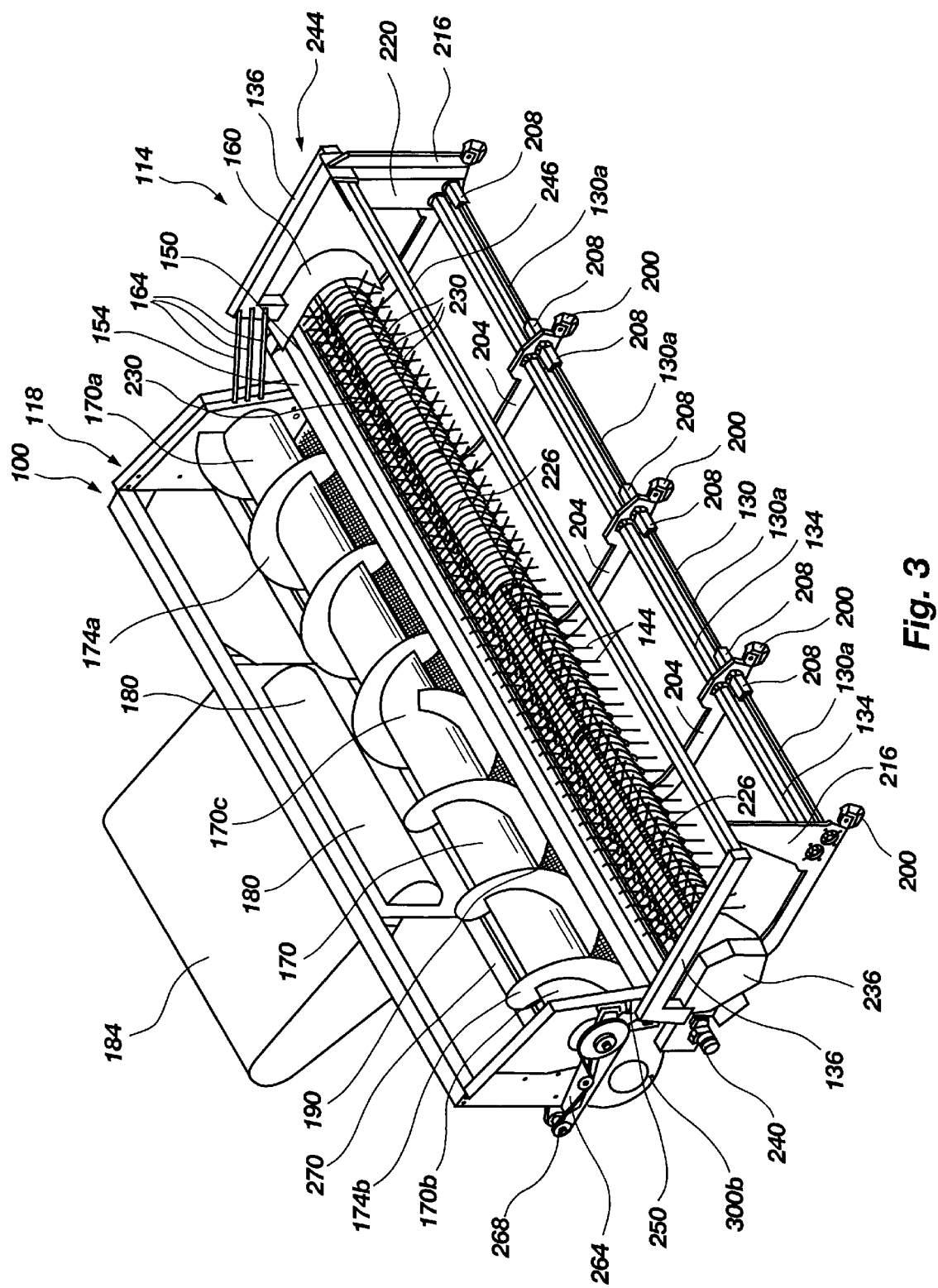
FIG. 3 shows a close-up, partial view of a portion of the direct harvester of the present invention which is shown in FIG. 2, but with the rear gauge wheel removed to reveal an adjustment device for altering the orientation of the harvesting device.

Turning now to FIG. 3, there is shown a close-up view of portions of the harvester 100 shown in FIG. 2, with the gauge wheels. Beginning at the cutting portion 110, a plurality of wear points 200 are disposed at the proximal end of a plurality of belly shanks 204 which are configured to hold the cutter rod 130 and the kicker rod 134 in place. As shown more clearly in FIG. 3, the cutter rod 130 is actually formed from a plurality of smaller rods 130a which are connected by couplers 208 to the belly shanks 204.

Disposed on lateral sides of the cutter rod 130 and the kicker rod 134 are a pair of side support shanks 216. One or both of the side support shanks 216 can have a chain case 220 which houses a drive chain mechanism (not shown) which drives both the cutter rod 130 and the kicker rod 134. Typically a hydraulic motor will be used for moving the drive chain mechanism.

Once a plant has passed over the cutter rod 130 and the kicker rod 134, it engages the fingers 144 of the pickup head 140. The pickup head 140 has a tube 226 which is surrounded by a plurality of rotor rods (some of which are indicated at 230) to prevent foliage from becoming entangled in the pickup head tube 226 and the fingers 144. The rotor rods 230 extend on lateral sides to a position adjacent the foliage flow shield 160.

Disposed at one end of the pickup head tube 226 is a pickup head chain guard 236. Disposed inside of the chain guard is a chain (not shown) which connects the pickup head tube 226 to a hydraulic motor 240. The hydraulic motor 240 is configured to rotate the pickup head tube 226 at a speed synchronize with the speed at which the harvester is moving. Likewise, the speed at which the first roller 150 and the second roller 154 rotate will generally be synchronize with the speed of the pickup head tube 226.

The cutting portion 110 and the lifting portion 114 are held by a common support frame 244 which includes the belly shanks 204, the support frame 136, and a cross bar 246. As will be discussed with respect to FIG. 4, the support frame 244 is able to pivot with respect to the feed portion 118, to thereby compensate for changes in terrain as the harvester 100 moves. Floating arm tension springs 250 may be provided to facilitate adjustments.

From the second roller 154, the plants being harvested are passed to the auger 170 which is driven by a drive chain and pulley system 260 disposed on a floating arm mount 264. The drive chain and pulley system 260 are configured to enable the auger 170 to continue rotating even as the position of the feed portion 118 of the harvester changes orientation.

As was described above, the auger 170 has opposing flights 174a and 174b which are configured to draw the plants toward the center 170c of the auger, and to direct the plants into the opening in the feed housing 184. As the auger 170 turns, additional soil is knocked loose from the plants and falls through the screened floor 190 disposed below the auger. A foliage control angle 270 will typically be disposed behind the auger 170 to control rearward movement of the plants.

Figure 4:
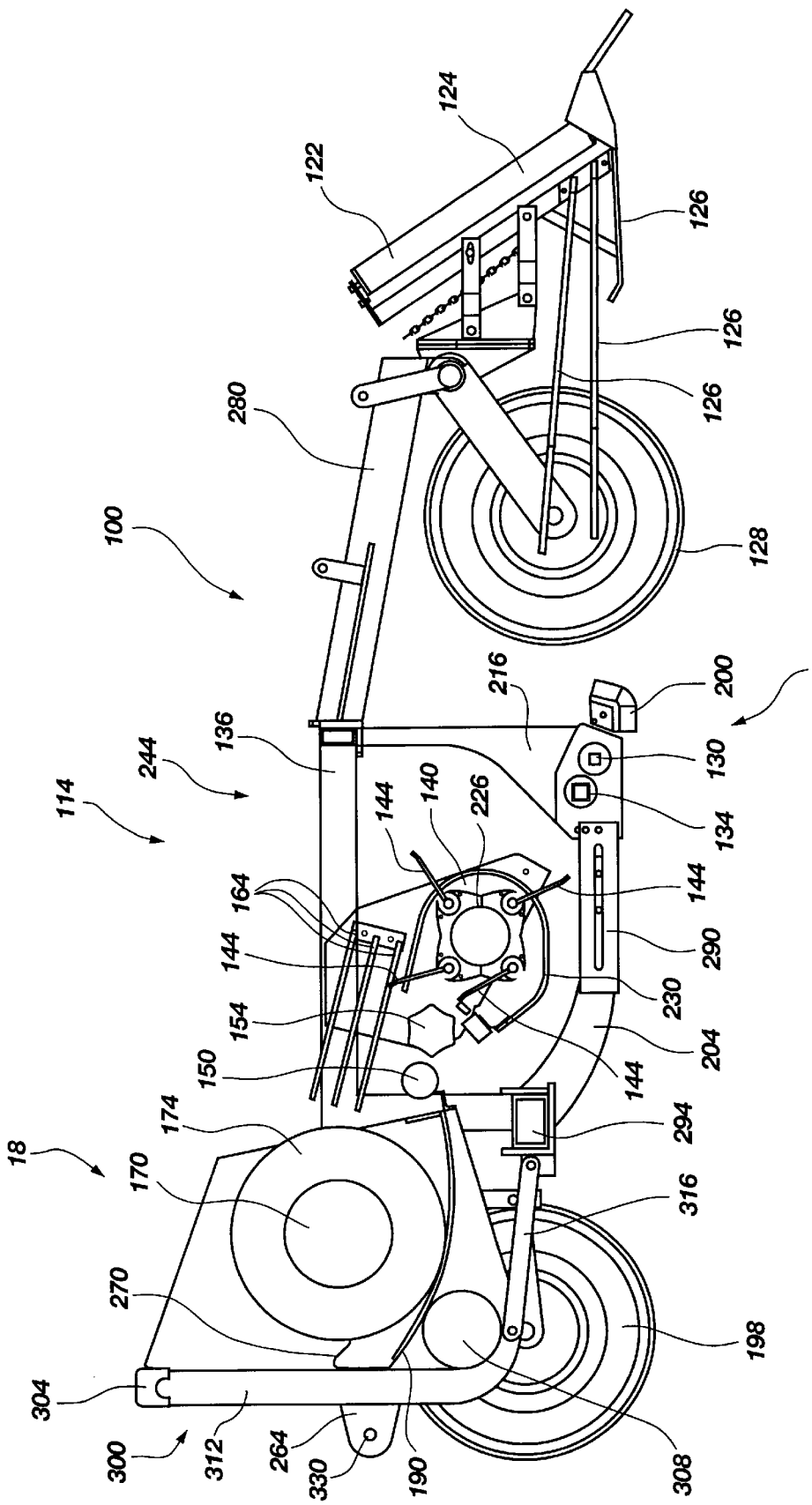
FIG. 4 shows a side cross-sectional view of the direct harvester shown in FIGS. 2 and 3.

Turning now to FIG. 4, there is shown a side, cross-sectional view of the harvester 100 shown in FIG. 2, and a portion of which is shown in FIG. 3. The harvester includes the cutting portion 110, the lifting portion 114, and the feed portion 118. Beginning at the far right, the foliage divider 122 is formed by the roller 124 and the angled rods 126 which are arranged to separate plants to prevent the plants from being damaged by the front gauge wheels 128. The foliage dividers 122 and front gauge wheels are attached by a front gauge wheel support frame 280 which connects these structures to the common support frame 244 which holds the cutter rods 136, the kicker rod 134, the pickup head 140 and the first and second rollers 150 and 154. As shown in FIG. 4, the belly shanks 204 may include an adjustment section 290, to enable the belly shanks to be adjusted in length or orientation. The belly shanks 204 extend upwardly to a main support frame member 294 which is disposed below and slightly rearwardly from the second roller 154.

Also shown in FIG. 4 is the attachment between the fingers 144 and the pickup head tube 226. Unlike many devices in which fingers are rigidly attached to a rotating member, the fingers 144 shown in FIG. 4 are pivotably attached to the pickup head tube 226. The pivotable attachment enables the fingers 144 to more easily withdraw from the harvested plants without becoming entangled therein.

Once the plants have been lifted to the top of the pickup head 140, they are passed over the first roller 150 which has a generally hexagonal geometry, and then over the second roller 154 which is generally round in cross-sectional geometry. Any soil knocked free of the first and second rollers 150 and 154 falls to the ground below the common support frame 244.

The plants are passed to the auger 170 where the plants are moved into the opening 180 (FIGS. 2 and 3) of the feed housing 184 (FIGS. 2 and 3). Soil falling off the plants as they are moved by the auger falls through the screen 190, thereby further reducing the amount of soil which enters the combine.

Also shown in FIG. 4 is the feeder support frame, generally indicated at 300. The feeder support frame 300 includes an upper support frame member 304 and a lower support frame member 308 which are connected by a generally vertical support member 312. A pivotable connector 316 extends from the bottom of the generally vertical support member 312 and engages the main support member 294 of the common support frame 244. The pivotable connector allows the feeder support frame 300 and the common support frame 244 to pivot with respect to one another, and thereby adapt to changes in terrain.

Extending rearwardly from the feeder support frame 300 is the floating arm mount 264. The floating arm mount 264 receives the auger drive shaft 330. Rotation of the auger drive shaft, of course, rotates the drive chain and pulley system 260 discussed with respect to FIG. 3.

While the direct harvester 100 appears relatively simple, the combination of elements contained therein overcomes the disadvantages of multiple step harvesting and provides a dramatic improvement in direct harvesting devices. As was indicated previously, current direct harvesters typically have a loss between 23 and 27 percent when used with beans such as navy beans. Such loss rates results in enormous amounts of product being left on the ground. In contrast, tests with the direct harvester 100 of the present invention have shown loss rates which are consistently less than 10 percent, and typically about 7 percent. Thus, the direct harvester of the present invention is able to reduce loss by as much as 75 percent over the other direct harvesting approaches currently used.

While loss rates are important, the speed at which the direct harvester 100 is able to harvest crops is also important. If a direct harvester is slow, either more harvesters must be used to harvest a crop, or the crop must be harvested over a longer period of time. The use of more machinery increases expenses, and extended harvest periods increase the likelihood that the crop will be lost to inclement weather. In addition to dramatically reducing the amount of loss, it has been found that the direct harvester 100 of the present invention can operate between about 30 and 33 percent faster than other direct harvesting systems. Thus, the direct harvester of the present invention simultaneously decreases the amount of machinery which must be used, and increases crop yield. Furthermore, by eliminating most of the soil from the bean plants, the present invention decreases the wear and tear on the combine with which the direct harvesting device is used.

Figure 5:
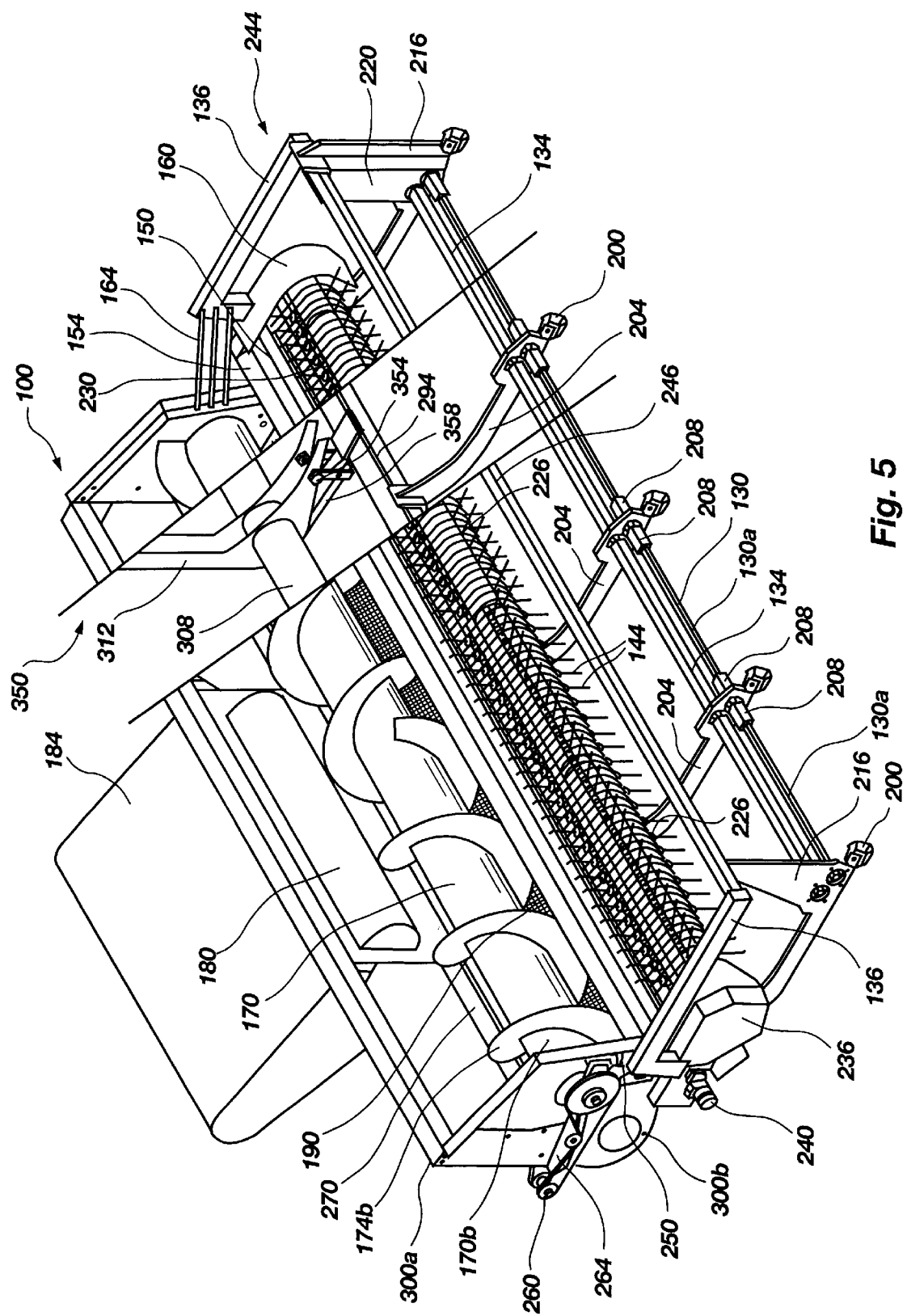
FIG. 5 shows a perspective, partially cut away view of the support structure of the direct harvester shown in FIGS. 2 through 4, along with the combine feeder housing.

Turning now to FIG. 5, there is shown a perspective, partially cut-away view of the direct harvester 100. The direct harvester 100 is substantially the same as that shown in FIG. 3 and is numbered accordingly. The partially cut-away portion, generally indicated at 350, has a portion of the auger 170 and a portion of the pick-up head 140 removed to enable visualization of the lower support frame member 308 and the generally vertical support frame member 312 of the feeder support frame 300. Such a view also shows a push bar 354 which is attached to the support frame 300, and a push bar guide 358. Preferably, the push bar guide 358 is provided with a first, floating setting and a second, rigid setting. When the push bar guide 358 is disposed in the first position, the cutting portion 110 and the lifting portion 114 are fixed with respect to the support frame 300.

Figure 6:
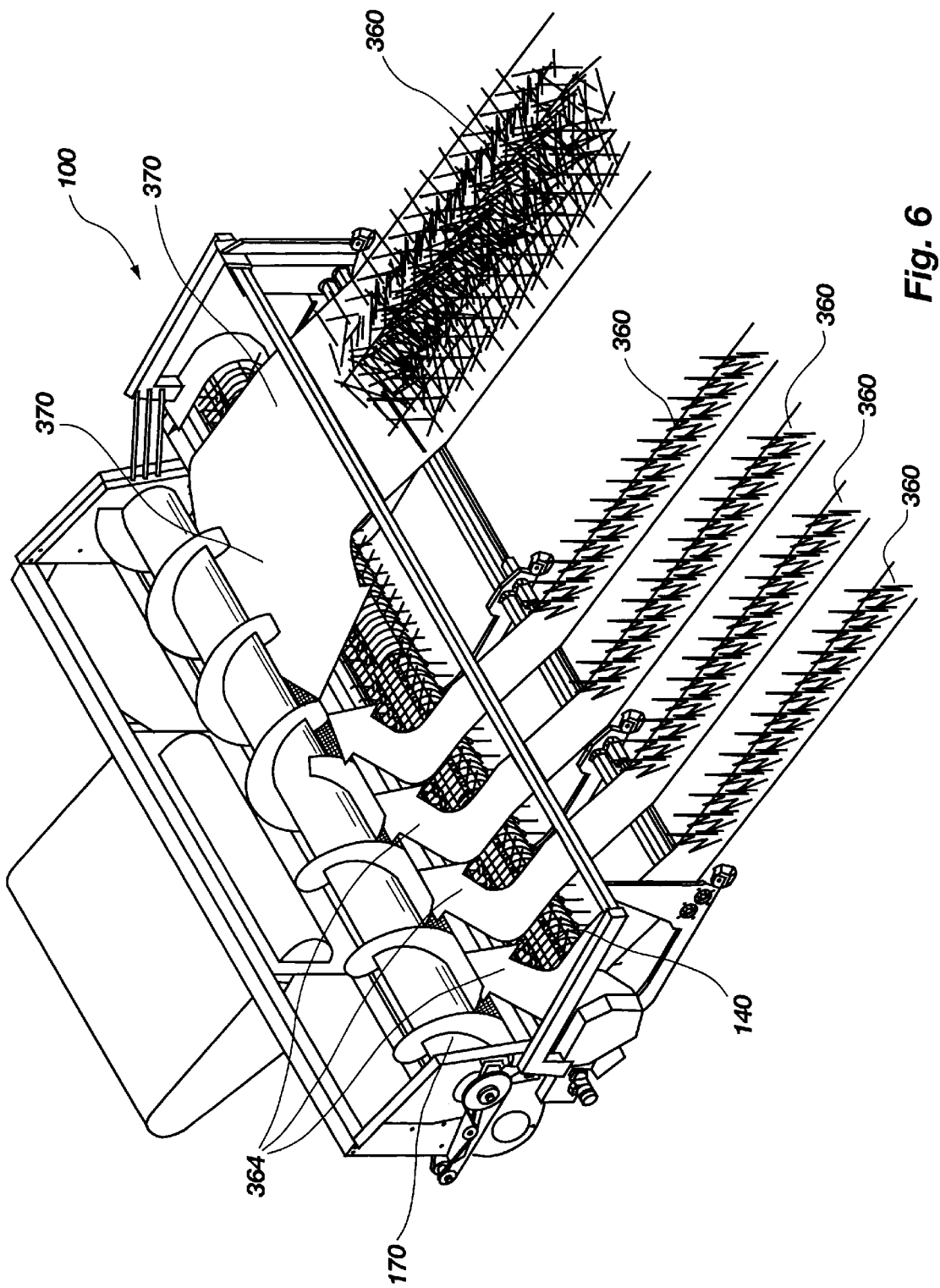
FIG. 6 shows a perspective view of the direct harvester of the present invention being used to harvest bean plants, and arrows indicating flow patterns of the bean plants while they are being harvested.

Turning now to FIG. 6, there is shown a perspective view of the direct harvester 100 being used to harvest bean plants. The left and right sides of the harvester are shown using two different harvesting methods. On the left side, a plurality of rows of bean plants 360 are being harvested. The cutter rod 130 cuts the bean plants 360 below the surface and the kicker rod 134 lifts the bean plants upwardly. The bean plants 360 are then lifted by the pick-up head 140 and passed over the first an second rollers 150 an 154. At each step additional soil is removed from the plants.

As indicated by the arrows 364, the beans 360 harvested from a plurality of rows follow a flow pattern which is well distributed across the pick-up head and auger 170. The distribution of the plants over the pick-up head 140 and the auger 170 helps to prevent crop flow overload—i.e. clogging of the harvester by excessive number of plants at a given location. Rather, the crops follow a generally even flow pattern and are able to be quickly harvested. The distributed flow pattern helps to enable the direct harvester 100 to harvest up to 33 percent more area per unit of time, as was discussed above.

On the right hand side, the arrow 370 represents the flow pattern of bean plants 360 when the plants are harvested from a windrow—as is common in the prior art. The large influx of bean plants 360 in a concentrated flow path increases the risk of crop flow overload. Should too many plants be concentrated in a small area, the harvester may become overloaded and stop functioning properly. Thus while the direct harvester 100 of the present invention could be used with windrowed crops, it is preferred that it be used for direct harvesting of plants.

Thus there is disclosed an improved direct harvesting device and method of use. Those skilled in the art will appreciate numerous modifications which can be made without departing from the scope and spirit of the present invention. The appended claims are intended to cover such modifications.

An aid to correlating the embodiment described to the figures shown in the drawings is provided:

CATALOGUE OF ELEMENTS

100 harvester
110 cutting portion
114 lifting portion
118 feeding portion
122 foliage dividers
124 roller
126 angled rods
128 front gauge wheel
130 cutter rod
134 kicker rod
136 rod support frame
140 pickup head
144 fingers
150 first roller
154 second roller
160 foliage flow shield
164 foliage control rods
170 auger
174*a* right flight
174*b* left flight
180 combine feeder housing opening
184 combine feeder housing
190 screen
198 rear gauge wheels
200 wear points
204 belly shanks
208 couplers
216 side support shanks
220 chain case
226 pickup head tube
236 pickup head chain guard
240 hydraulic motor
244 common support frame
246 cross bar
250 floating arm tension springs
260 drive chain and pulley system
264 floating arm mount
270 foliage control angle
280 front gauge wheel support frame
290 adjustment section
294 main support frame member
300 feeder support frame 304 upper support frame member
308 lower support frame member
312 generally vertical support member
316 pivotable connector
330 auger drive shaft
350 cut-away portion
354 push bar
358 push bar guide

What is claimed is:

1. A direct harvester for harvesting plants having pods from soil, the direct harvester comprising:
   cutting means for cutting a plant from the soil, the cutting means including a rotatable bar selectively disposable a distance below the soil surface and movable so as to sever the plant below the soil surface;
   a pickup mechanism for lifting the plants above the soil surface and configured for allowing soil to fall from the plants, said pickup mechanism comprising a rotatable pickup head having a long axis and a plurality of moveable fingers pivotably attached thereto, and being selectively disposable a distance above the soil surface; and
   auger means for receiving the plants from the pickup mechanism and for channeling the plants into a feeder housing of a combine.

2. The direct harvester of claim 1, wherein the cutting means comprises a rotatable cutting rod and a rotatable kicker rod, the rotatable kicker rod being disposed rearwardly and upwardly from the cutting rod.

3. The direct harvester of claim 1, wherein the plurality of moveable fingers are pivotably attached to the rotatable pickup head.

4. The direct harvester of claim 1, further comprising a slinger mechanism disposed between the pickup mechanism and the auger means, the slinger mechanism comprising at least one roller for moving plants from the pickup mechanism to the auger means.

5. The direct harvester of claim 4, wherein the slinger mechanism comprises a first roller and a second roller, the first and second rollers being disposed between the pickup mechanism and the auger means.

6. The direct harvester of claim 5, wherein the first roller has a polygonal cross-sectional geometry and wherein the second roller has a circular cross-sectional geometry.

7. The direct harvester of claim 1, wherein the auger means includes an auger having a left portion, a right portion and a central portion, and wherein the auger means comprises a plurality of flights disposed on the auger, the flights having a helical configuration and being disposed so as to channel plants engaging the auger toward the central portion of the auger.

8. The direct harvester of claim 1, wherein the auger means comprises an auger having flights for moving plants, and a floor disposed beneath the auger, the floor being screened so as to enable soil falling from the plants moved by the auger to fall to the soil disposed beneath the auger means.

9. The direct harvester of claim 8, wherein the floor disposed beneath the auger is arcuate.

10. The direct harvester of claim 1, wherein the auger means further comprises a foliage control angle disposed on a side of the auger opposite the pickup means.

11. The direct harvester of claim 1, wherein the harvester further comprises foliage shield means configured to limit outward lateral movement of foliage passing over the pickup means.

12. The direct harvester of claim 1, wherein the harvester comprises a cutting portion, a lifting portion and a feeding portion, the cutting portion containing the cutting means, the lifting portion containing the pickup mechanism and the feeding portion containing the auger means, and wherein the lifting portion is pivotably attached to the feeding portion.

13. The direct harvester of claim 12, wherein the harvester further comprises a guide means for selectively preventing pivoting of the lifting portion with respect to the feeding portion.

14. The direct harvester of claim 1, wherein the harvester further comprises gauge means for adjusting the distance of the pick-up means and the cutting means from the soil surface.

15. The direct harvester of claim 1, wherein the rotatable pickup head comprises a rotatable tube.

16. A direct harvester for harvesting plants, the direct harvester comprising:
   a cutting portion for cutting the plants from soil in which the plants are grown, the cutting portion including a rotating cutting rod configured for cutting the plants below the soil's surface;
   a lifting portion connected to the cutting portion, the lifting portion including a pickup head comprising a rotatable axle and a plurality of moveable fingers attached to the axle, for lifting cut plants from the soil's surface, and slinging means for moving the plants rearwardly toward an auger means; and
   a feeding portion configured for attachment to a combine and pivotably connected to the lifting portion, the feeding portion including an auger means for receiving plants from the lifting portion and moving the plants into a feeder housing of a combine.

17. The direct harvester of claim 16, wherein the cutting portion further comprises a kicker rod disposed adjacent to the cutting rod for lifting the plants cut by the cutter rod and for encouraging separation of the plants and soil.

18. The direct harvester of claim 16, wherein the plurality of moveable fingers are pivotably attached to the axle.

19. The direct harvester of claim 16, wherein the slinging means comprises at least two rotating rods having different cross-sectional geometries.

20. The direct harvester of claim 16, wherein the feeding portion further comprises a floor disposed beneath the auger means, said floor being formed by a screen material having holes sufficiently large to allow soil to pass therethrough, but sufficiently small to prevent beans from passing therethrough.

21. The direct harvester of claim 16, wherein the auger means comprises an auger having a first flight and a second flight, the first flight being disposed around the auger in a first helical direction and the second flight being disposed about the auger in a second helical direction.

22. The direct harvester of claim 21, wherein the auger has a right side, a left side and a center, and wherein the first flight is disposed on the right side of the auger and is disposed to channel plants engaging said first flight toward the center of the auger, and wherein the second flight is disposed on the left side of the auger and is configured to channel plants engaging said second flight toward the center of the auger.

23. The direct harvester of claim 16, further comprising guide means for selectively preventing pivoting of the lifting portion with respect to the feeding portion.

24. The direct harvester of claim 16, wherein the rotatable axle comprises a rotatable tube.

25. A method for harvesting plants having pods disposed above a soil surface, the method comprising:
   a) passing a first rotating bar through the soil so as to sever the plants below the soil surface;

b) passing a second rotating bar rotating in an opposite direction as the first rotating bar through the soil at a level above the first rotating bar lift the plants onto the soil surface;

c) lifting the plants from the soil surface to remove soil from the plants;

d) passing the plants through an auger to further remove soil from the plants, and e) passing the plants into a feeder housing disposed in a combine.

26. A method for harvesting plants having pods disposed above a soil surface, the method comprising the steps of:

a) passing a first rotating bar through the soil so as to sever the plants below the soil surface;

b) passing a second rotating bar through the soil at a level above the first rotating bar and rotating the second rotating bar to lift the plants onto the soil surface;

c) lifting the plants from the soil surface to remove soil from the plants;

d) passing the plants over a plurality of rotating rollers;

e) passing the plants through an auger to further remove soil from the plants; and f) passing the plants into a feeder housing disposed in a combine.

27. A method for manufacturing a direct harvester for plants having pods above the soil surface, the method comprising:

forming a cutting portion having a first rotating bar and a second rotating bar disposed rearward and above the first rotating bar;

forming a lifting portion having a pickup head formed by a rotatable tube with a plurality of fingers disposed thereon and attaching the lifting portion to the cutting portion; and forming a feeding portion having an auger configured to receive plants from the pickup head and to direct the plants to a combine feeder housing and attaching the feeding portion to the lifting portion so as to enable the feeding portion and the-lifting portion to pivot with respect to one another.

28. The method for manufacturing the direct harvester of claim 27, wherein forming the lifting portion further comprises positioning a slinger mechanism adjacent to the pickup head to move plants from the pickup head to the auger of the feeding portion.

29. The method for manufacturing the direct harvester of claim 27, wherein the method further comprises forming a floor under the auger, the floor having a plurality of holes formed therein to allow sail knocked free from the plants to fall away from the auger.

* * * * *